United States Patent Office 3,341,334
Patented Sept. 12, 1967

3,341,334
COLD WATER SOLUBLE GELATIN MADE WITH CANDY MELTS
William A. Mitchell, Lincoln Park, N.J., and William C. Seidel, Monsey, N.Y., assignors to General Foods Corporation, White Plains, N.Y., a corporation of Delaware
No Drawing. Filed Jan. 25, 1966, Ser. No. 522,826
6 Claims. (Cl. 99—130)

This invention relates to a method for preparing a gelatin powder and more particularly to the preparation of a cold water-soluble gelatin powder.

Gelatin food products such as desserts or gelatin-containing salads have become increasingly popular in recent years because they are easy to prepare, are non-filling and are easily digested. The flavor of gelatin-containing desserts is constantly being improved as new flavor ingredients and new methods of incorporating flavors into gelatin products are discovered.

Most of the gelatin dessert products now on the market must be dissolved in very hot water. This is due to low solubility of the powder in cold or luke-warm water. If one attempts to dissolve a gelatin dessert mix in cold water he quickly finds that the gelatin aggregates, forming lumps of gelatin which are difficult to break up and which can only be dissolved by heating the water-gelatin powder mixture.

There are several disadvantages associated with the present day gelatin food products because of the fact that they are soluble only in hot water. A major disadvantage is that the gelatin product requires between two and four hours to set. Another major disadvantage is that the selection of flavor ingredients usable in gelatin food products is limited to those which will not volatilize at the temperature required for dissolving the gelatin.

Cold water-soluble gelatin compositions are taught by Cahn et al. in U.S. Patent 2,841,498. This patent teaches a method of preparing cold water-soluble gelatin food products which involves making an aqueous solution of sucrose and gelatin and spray-drying the mixture to form a powdered product. A limitation of Cahn et al.'s process is that the sucrose concentration must be at least eight times that of the gelatin concentration. Another disadvantage is that the gelatin-sucrose mixture is spray-dried thereby exposing the gelatin to degradation due to heat. Excessive heat can also cause a browning effect when a mixture of a reducing sugar, such as dextrose, and gelatin are co-dried.

Another U.S. patent which teaches the preparation of cold water-soluble gelatin powders is 2,803,548, issued to Hagerty. The process taught in this patent also suffers from the disadvantage that an aqueous solution of a sugar and gelatin must be co-dried.

We have now discovered a method for preparing a cold water-soluble gelatin containing powder made up primarily of a sugar and gelatin which does not include the step of drying the sugar-gelatin dispersions; consequently the gelatin is not subjected to degradation nor is the powdered dispersion subjected to browning due to excessively high temperatures.

Accordingly it is an object of the present invention to provide an improved cold water-soluble gelatin-containing powder. It is another object of the invention to provide a sugar-gelatin food powder of improved color and flavor. It is a third object of the instant invention to provide a process for preparing a gelatin food product of improved color and flavor. It is a further object of the invention to provide a process for preparing a sugar-gelatin dispersion which is made while the sugar is in the liquid or semi-solid state and which does not have to be dried. These and other objects of the present invention will become apparent from the following description and examples.

It is well known that aqueous solutions of many substances can be highly concentrated at elevated temperatures and cooled considerably below the temperature at which the solutions are saturated, to form highly viscous liquids or semi-solid "glasses" without the formation of crystals of the solute material. It is also well known that solutions of mixtures of some substances, such as sugars, can be concentrated to an even greater degree than each component of the mixture could be concentrated to if used alone. In other words, the presence of a second sugar lowers the temperature at which crystallization of a first sugar would take place. The present invention is based on this principle and provides a method of preparing dry sugar-gelatin dispersions from dry liquid or semi-solid sugar melts.

According to the present invention a supersaturated solution of different forms of the same sugar or of two different sugars is made by adding the sugar or sugars to water and concentrating the resulting mixture until the moisture content is below about 5% by weight. The resulting liquid melt is cooled to a temperature just above the crystallization point of the melt. At this point finely ground gelatin is added to the sugar melt and after thorough blending to insure uniformity of dispersion the temperature of the mixture is rapidly cooled to below the crystallization temperature. Upon crystallization, a product results which is dry and can be sized and screened without agglomeration of the particles. It is an important step in this process to rapidly cool the sugar-gelatin melt to a temperature below that at which degradation of the gelatin and the browning reaction occur.

The preferred sugar ingredient is a mixture of commercial dextrose and the anhydro form of dextrose. This mixture is prepared by making up a concentrated solution of commercial dextrose and evaporating the water. After almost all of the water is removed from the solution, which occurs at about 160° C., some of the hydrated dextrose is converted to the anhydro form of the sugar. After a sufficient amount of the sugar is converted the temperature is lowered to a temperature just above that at which crystallization will occur. This temperature is about 90° C. At this point the sugar mixture is in the liquid state and is ready to receive the finely ground gelatin with little danger of degrading the gelatin or browning the mixture.

Other sugar mixtures can be used such as lactose-dextrose and lactose-sucrose. When mixtures of different sugars are used they are dissolved in water, heated until most of the water is removed (about 160° C.) and cooled to a temperature just above the crystallization point, at which temperature the finely ground gelatin can be added. Although lactose-dextrose and lactose-sucrose systems give good results, the preferred combination is a mixture of dextrose and a small amount of anhydro dextrose. This combination gives excellent results because a greater degree of super-cooling can be attained and because dextrose crystallizes rapidly from such a mixture at a low temperature.

After the gelatin is mixed into the sugar melt the temperature is rapidly lowered to prevent degradation of the gelatin or browning of the mixture. Upon further lowering of the temperature, the sugar crystallizes, resulting in an intimate mixture in which the finely ground gelatin is enveloped in sugar crystals. The sugar crystal formation insulates the gelatin particles from one another thereby preventing the gelatin particles, which normally have a great affinity for water, from agglomerating.

If it is desired to hasten the transition of the sugar from the glass form to the crystal form, the melt can be seeded as by adding finely ground crystals of sugar to the sugar-gelatin dispersion. This promotes crystallization by providing crystal sites.

The resulting product, now in the form of crystallized chunks, is comminuted to the desired particle size by any suitable means, such as by grinding. The ground powder is not hydroscopic and since it is free flowing it can be further processed without special handling. When the finished product is mixed in cold water the sugar crystals dissolve easily permitting the gelatin to dissolve without forming agglomerates.

In order that the invention may be better understood the following examples will serve to illustrate specific embodiments of the invention.

Example I

Dextrose (200 grams) was mixed with 40 ml. of water and heated to 160° C. The resulting molten mass was cooled to 90° C. and mixed with 160 grams of spray-dried gelatin by means of a Hobart Mixer. Immediately following the incorporation of the gelatin, 75 grams of dextrose seed was mixed into the mass and the mass was rapidly cooled to room temperature by spreading it in a thin layer on aluminum foil. The cooled product was ground in a Waring Blendor into a clean white powder which was screened. The fraction passing through a number 40 mesh screen and collected on a number 140 mesh screen was used in a gelatin dessert recipe.

The dry, powdered gelatin dessert mix was added to water at 19° C. The powdered mix dissolved rapidly in the water and formed a good gelatin dessert.

Example II

A gelatin dessert mix was prepared according to the process of Example I. The mix was added to water at 10° C. and dissolved in about two minutes. The dissolved gelatin mix formed a good gelatin dessert.

Since certain changes may be made in carrying out the above method without departing from the scope of the invention, it is intended that all matter contained in the above description and examples shall be interpreted as illustrative only and that the scope of the invention shall be determined by the scope of the appended claims.

Having described our invention, what we claim as new and desire to secure by Letters Patent is:

1. A process for preparing a cold water-soluble gelatin powder comprising:
    (a) dissolving a saccharic substance selected from the group consisting of sugars and mixtures of sugars in water, and heating the solution until no more than about 5% moisture remains,
    (b) cooling the resulting sugar melt to a temperature just above the crystallization point of the sugar,
    (c) mixing a predetermined amount of gelatin with the sugar melt,
    (d) rapidly cooling the sugar-gelatin dispersion, and
    (e) comminuting the sugar-gelatin dispersion.

2. A process according to claim 1 wherein the saccharic substance is selected from the group consisting of commercial dextrose, lactose and dextrose, lactose and sucrose, lactose and corn syrup solids and sucrose and corn syrup solids.

3. A process according to claim 1 wherein the sugar-gelatin dispersion is seeded with sugar crystals prior to being cooled.

4. A process according to claim 1 wherein the gelatin is blended into the sugar melt as it is being cooled.

5. A process for preparing a cold water-soluble gelatin powder comprising:
    (a) dissolving commercial dextrose in water and heating the solution to about 160° C.,
    (b) evaporating water from the dextrose solution until less than about 5% water remains whereby a portion of the dextrose is converted to the anhydro form,
    (c) cooling the resulting melt to a temperature just above the crystallization point of said melt,
    (d) mixing a predetermined amount of finely ground gelatin with said melt to form a dispersion,
    (e) rapidly cooling the dextrose-gelatin dispersion to effect crystallization of the dextrose, and
    (f) comminuting the crystallized dextrose-gelatin dispersion.

6. A process according to claim 5 wherein additional dextrose crystals are added to the dextrose-gelatin dispersion.

References Cited

UNITED STATES PATENTS

| | | | |
|---|---|---|---|
| 2,046,567 | 7/1936 | Lund | 99—141 |
| 2,803,548 | 8/1957 | Hagerty | 99—130 |
| 2,834,683 | 5/1958 | Corben et al. | 99—130 |
| 2,841,498 | 7/1958 | Cahn et al. | 99—130 |
| 3,152,913 | 10/1964 | Polya et al. | 99—140 |

A. LOUIS MONACELL, *Primary Examiner.*

RAYMOND N. JONES, *Examiner.*

J. M. HUNTER, *Assistant Examiner.*